United States Patent

[11] 3,590,442

[72] Inventor George H. Geisinger
 Mountainside, N.J.
[21] Appl. No. 1,143
[22] Filed Jan. 7, 1970
[45] Patented July 6, 1971
[73] Assignee Thomas & Betts Corporation
 Elizabeth, N.J.

[54] BUNDLING STRAP
 13 Claims, 5 Drawing Figs.
[52] U.S. Cl. .................................................... 24/16 PB
[51] Int. Cl. ............................................. B65d 63/00
[50] Field of Search........................................... 24/16 BP,
 30.5 P, 17 A

[56] References Cited
 UNITED STATES PATENTS
2,936,980 5/1960 Rapata ......................... 24/16 PB UX
3,102,311 9/1963 Martin et al. .................. 24/16 PB
3,155,987 11/1964 McGill ......................... 24/16 PB X
3,339,246 9/1967 Geisinger ..................... 24/16 PB
3,486,200 12/1969 Orenick ....................... 24/16 PB
3,486,201 12/1969 Bourne ........................ 24/16 PB Primary Examiner—Donald A. Griffin
Attorney—David Teschner ABSTRACT: A bundling strap for looping about articles, comprised of an elongated, flexible, serrated body integral with and extending from an apertured head and terminating in a tail extension. One end of a dual-ended, obliquely angled, unidirectional locking means is hingedly coupled within a first transverse aperture in the head and is integral therewith, being adapted to lockingly engage the serrations on the elongated body inserted within a second transverse aperture in the head proportioned to conveniently receive the body therein, said locking means thereby preventing the attempted withdrawal of the body from the apertured head.

PATENTED JUL 6 1971  3,590,442

INVENTOR.
GEORGE H. GEISINGER
BY
ATTORNEY

BUNDLING STRAP

BACKGROUND OF THE INVENTION

1. Field of the Invention

The invention is directed to the field of bundling one or more articles to form a more conveniently handled unit. Similarly, the device may be used to rapidly and conveniently secure one item to another.

2. Description of the Prior Art

Prior art devices for bundling one or more articles together generally required the addition of at least one separate member, such as a metal barb or the like, inserted in the head portion, in an attempt to provide adequate locking means to prevent the removal of the strap body from the head after insertion therein, such operation being costly and time-consuming. Additionally, a relatively small dimensional deviation of the locking means from its specified critical location within the head, and variation in the characteristics of the materials used, would result in uncertain and generally ineffective locking action.

SUMMARY OF THE INVENTION

The present invention overcomes the difficulties noted above with respect to known prior art devices by providing an improved one-piece bundling strap which is less expensive and more reliable than such prior art devices. Firstly, in the preferred embodiment, an elongated, serrated, flexible body portion extends from one end of an apertured head portion a predetermined length, terminating in a serrated tail portion. Hingedly coupled to the other end of the head portion, displaceable wholly therewithin, integral therewith, and depending inwardly within a first transverse aperture therein from a first aperture defining surface thereof, is a locking member having a tapered first end, a second end, and a flat, smooth surface therebetween, said surface obliquely angled with respect to the longitudinal axis of the first transverse aperture. The first end of the locking member extends at least partially into a second transverse aperture in the head portion of the device, causing a partial restriction thereof, being displaceable therefrom to allow the insertion and passage therethrough, of the flexible body portion in a first or forward direction. An inclined portion adjacent the first end of the locking member is configured to lockingly engage the complementarily contoured serrations on a first surface of the body portion, preventing the attempted removal of the body from the head portion after its insertion therein. A portion of the first aperture defining surface immediately adjacent the second end of the locking member provides stop means therefor, restricting the displacement thereof resulting from the attempted withdrawal of the body portion from the apertured head, imparting a further locking action to the locking member. It is therefore an object of this invention to provide an improved bundling strap.

It is another object of this invention to provide an improved bundling strap having an integrally formed locking member within the head portion thereof.

It is yet another object of this invention to provide an improved bundling strap wherein the locking means is disposed wholly within the head portion and displaceable between a first face and a second face thereof.

It is a further object of this invention to provide an improved bundling strap having a dual-ended, obliquely angled, unidirectional locking means hingedly coupled to and integral with an inner aperture defining surface within the head portion, and adapted to selectively engage complementary serrations on a first surface of the body portion, preventing the attempted withdrawal of said body portion from the head portion.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
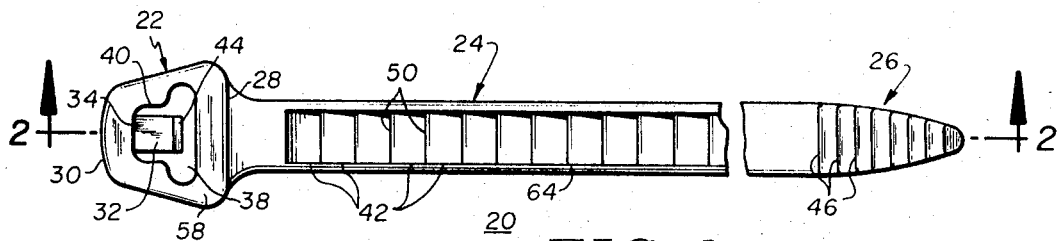
FIG. 1 is a top plan view of a bundling strap constructed in accordance with the concepts of the invention.
Figure 2:
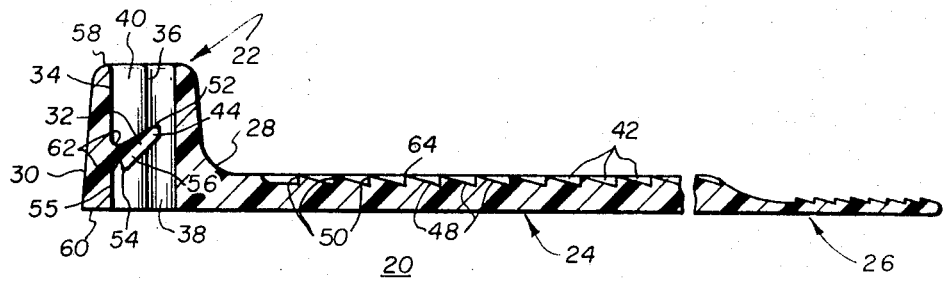
FIG. 2 is a side elevation view, in section, of the bundling strap of FIG. 1, taken along the lines 2-2.
Figure 3:
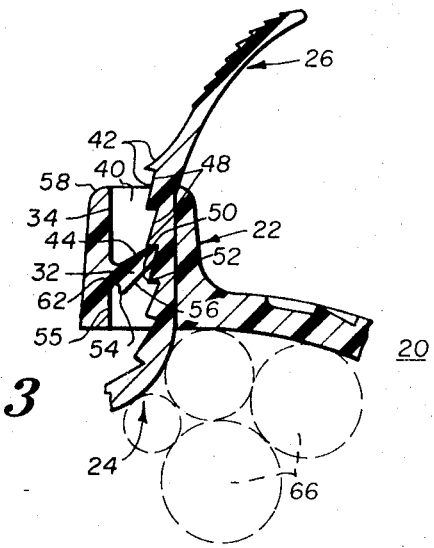
FIG. 3 is a front elevation view, in section, of the bundling strap of FIG. 1, taken along the lines 2-2, looped about selective articles, and illustrating the unidirectional locking feature of the invention.

Turning now to FIGS. 1, 2 and 3, there is shown a first embodiment of a bundling strap 20 constructed in accordance with the concepts of the invention. A serrated, elongated, flexible body portion 24 depends from a second end 28 of head portion 22, terminating in a tail portion 26. A first transverse aperture 40 and a second transverse aperture 38 communicating therewith, at a common juncture 36, extend between a first face 58 and a second face 60 of said head portion 22. Depending from, integral with, and hingedly coupled to, a first aperture defining surface 34 adjacent a first end 30 of the head portion 22, is a locking means 32, comprising a tapered first end 44, a second end 54, and a flat, smooth first surface 56 therebetween, the plane of first surface 56 of locking means 32 being inclined substantially oblique to the longitudinal axis of first transverse aperture 40. A portion of the first end 44 of locking means 32 extends at least partially into the second transverse aperture 38 of head portion 22, causing a partial restriction thereof. As may be better seen in FIG. 3, adjacent the first end 44 of locking means 32 is an inclined portion 52 adapted to cooperate with a complementary vertical portion 50 of one of a plurality of tooth-type serrations 42 disposed along first surface 64 of body portion 24, to lockingly engage body portion 24 within the second transverse aperture 38 in head portion 22, preventing its removal therefrom. The first end 44 and the second end 54 of locking means 32 are displaceably disposed wholly within head portion 22 between the first face 58 and the second face 60 thereof. Interposed between the first surface 56 of locking means 32 and the first aperture defining surface 34 from which it depends is a necked-down portion 62, adapted to facilitate the partial displacement of locking means 32, to permit the passage of body portion 24 through the second transverse aperture 38 upon its insertion therein in a first, engaging direction. Adjacent the second end 54 of locking means 32, and in close proximity thereto, is a portion 55 of the first aperture defining surface 34 which provides stop means for the second end 54, to restrict the displacement thereof, upon the attempted removable of body portion 24 from head portion 22. A tail portion 26 extends from body portion 24 as a termination thereof, permitting the convenient insertion of body portion 24 within the second transverse aperture 38 which is configured to appropriately receive the body portion 24 therein. Serrations 46 disposed along tail portion 26 provide a more effective grasping surface for guiding and drawing body portion 24 through the second transverse aperture 38.

In practice, and referring now to FIG. 3, tail portion 26 is initially inserted within second transverse aperture 38 in a first engaging direction, as shown, body portion 24 being looped about articles such as 66 enclosed therein. Serrations 42, disposed along first surface 64 of body portion 24, forcibly displace first end 44 of locking means 32 to permit further passage of body portion 24 through the second transverse aperture 38 to obtain a sufficient tightness about articles 66. Upon the release of body portion 24, locking means 32 tends to return to its first normal position, inclined portion 52 of first end 44 cooperating with vertical surface 50 of an adjacent tooth-type serration 42 on body portion 24 to effect a unidirectional lock therebetween, body portion 24 being gripped between locking means 32 and an adjacent wall of the second transverse aperture 38, and restrained from removal therefrom. The attempted withdrawal of body portion 24 from head portion 22 is prevented by the restraining action of inclined portion 52 of locking means 32 against the adjacent vertical portion 50 of tooth-type serration 42, the withdrawing force additionally causing a displacement of second end 54 of locking means 32 against the adjacent portion 55 of the first aperture defining surface 34, said portion 55 restricting the further displacement of second end 54 of locking means 32, increasing the locking action thereof.

Figure 4:
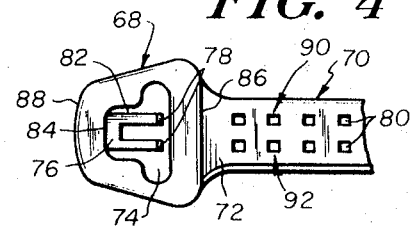
FIG. 4 is a top plan view of the head portion and part of the body portion of a bundling strap constructed in accordance with another embodiment of the invention.

Referring now to FIG. 4 there is shown another embodiment of a bundling strap constructed in accordance with the concepts of the invention. Body portion 70 extending a predetermined length from a second end 86 of head portion 68 has disposed thereon, along a first surface 72 thereof, a plurality of substantially regularly spaced tooth-type serrations 80 in the form of two rows 90 and 92 in spaced apart substantially parallel relationship. A generally bifurcated locking means 76, integral with, hingedly coupled to, and depending from, a first aperture defining surface 84 within a first transverse aperture 82, provides a pair of first ends 78 thereby, each extending at least partially into a second transverse aperture 74 in head portion 68, causing a partial restriction thereof, in a manner similar to that described with respect to locking means 32 of FIGS. 1, 2 and 3. Similarly, unidirectional locking engagement between first ends 78 and associated cooperating vertical portions of serrations 80 on body portion 70 is accomplished generally as described hereabove with respect to bundling strap 20 of FIGS. 1, 2 and 3. It will be understood that rows 90 and 92 may be laterally disposed alternately along first surface 72 of body portion 70, to provide an increased number of discrete locking positions.

Figure 5:
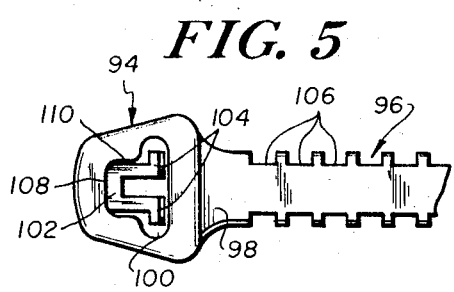
FIG. 5 is a top plan view of the head portion and part of the body portion of a bundling strap constructed in accordance with a further embodiment of the invention.

Referring now to FIG. 5, there is shown a further embodiment of a bundling strap constructed in accordance with the concepts of the invention. Body portion 96 extending from head portion 94 in a manner similar to that described above has disposed along both edges thereof a plurality of regular indentations 106. Locking means 102 is contoured substantially as described with respect to locking means 32 of FIGS. 1, 2 and 3, and disposed within head portion 94 in similar manner, differing from locking means 32, however, in that first end 104 of locking means 102 is generally bifurcated, each of the two parts thus formed being laterally disposed in spaced apart relationship and adapted to cooperate in unidirectional locking engagement with indentations 106 of body portion 96 upon its insertion within second transverse aperture 100 of head portion 94, an inclined portion (not shown) adjacent first end 104 of locking means 102 being adapted to engage an adjacent vertical surface of a cooperating portion of indented body portion 96, to prevent the removal thereof from head portion 94. It will be understood that although body portion 96 is shown indented along both of its edges, the indentations may be confined to a single edge without impairing the locking action thereof. It will also be understood that the indentations along one edge of body portion 96 may be disposed in alternate lateral relationship with those of the other edge, to provide an increased number of discrete locking positions thereby.

The embodiments of the invention in which an exclusive property or privilege I claim are defined as follows:

1. A bundling strap for looping about articles, comprising: a head portion having a first face and a second face thereon; a tail portion; an elongated flexible body portion therebetween; said head portion having a first and a second transverse aperture there through extending between said first face and said second face thereof, said second transverse aperture communicating with said first transverse aperture at a common juncture therebetween, and proportioned to receive therein said body portion, said first transverse aperture having a first aperture defining surface therein remote from said juncture and adjacent a first end of said head portion; and locking means integral with said first aperture defining surface, hingedly coupled thereto generally intermediate said head portion first and second faces and depending from said first aperture defining surface by means of a necked-down portion thereon, said locking means having a tapered first end, a second end, and a first surface therebetween, said first surface of said locking means being inclined in oblique planar relationship with said first aperture defining surface, said first end of said locking means extending towards said first face of said head portion and into said second transverse aperture causing at least a partial restriction thereof, said second end of said locking means directed rearwardly towards said second face of said head portion and positioned wholly within said first transverse aperture, said necked-down portion being positioned generally intermediate said locking means first and second ends; said body portion extending from a second end of said head portion a predetermined length, said second end of said head portion being disposed substantially opposite said first end thereof, said body portion having a first surface thereon adapted to at least partially deflect said locking means upon the passage of said body portion through said second transverse aperture in said head portion, said second end of said locking means being displaceable towards said first aperture defining surface, said surface providing stop means for said second end, to restrict the displacement thereof.

2. A bundling strap as defined in claim 1 wherein said first end of said locking means is disposed wholly within said head portion, intermediate said first face and said second face thereof, and below said first face.

3. A bundling strap as defined in claim 2 wherein said second end of said locking means is disposed wholly within said head portion intermediate said first face and said second face thereof.

4. A bundling strap as defined in claim 3 wherein said first surface of said locking means is substantially smooth.

5. A bundling strap as defined in claim 4 wherein said first end of said locking means is essentially bifurcated.

6. A bundling strap as defined in claim 5 wherein said body portion has a plurality of substantially regular indentations along at least one edge thereof for engaging said first end of said locking means.

7. A bundling strap as defined in claim 4 wherein said body portion has a plurality of substantially regular depressions in said first surface thereof for engaging said first end of said locking means.

8. A bundling strap as defined in claim 7 wherein said depressions are contoured to form a plurality of substantially tooth-type serrations, each having an inclined surface and a substantially vertical surface, said vertical surface disposed generally perpendicular to the plane of said first surface of said body portion, for engaging said first end of said locking means.

9. A bundling strap as defined in claim 8 further comprising an inclined portion adjacent said first end of said locking means proportioned to selectively engage an adjacent vertical surface of said tooth-type serration on said body portion upon the insertion of said body portion within said head portion, providing a unidirectional lock thereby, said inclined portion of said first end being displaceable into further engagement with an adjacent portion of said vertical surface of said serration, said second end of said locking means being simultaneously displaceable towards said first aperture defining surface, said surface providing stop means for said second end, preventing the further displacement thereof.

10. A bundling strap as defined in claim 1 wherein said tail portion is at least partially serrated.

11. A bundling strap as defined in claim 1 wherein said first face of said head portion is disposed in substantially parallel planar relationship with said second face thereof.

12. A bundling strap as defined in claim 1 wherein said body portion depends from said second end of said head portion substantially adjacent said second face thereof.

13. A bundling strap as defined in claim 1 wherein said first surface of said locking means is substantially flat.